United States Patent
Haas

[15] 3,670,392
[45] June 20, 1972

[54] METHOD OF MAKING FLEXIBLE BRAKE BANDS

[72] Inventor: Charles H. Haas, Philadelphia, Pa.
[73] Assignee: The Budd Company, Philadelphia, Pa.
[22] Filed: Dec. 29, 1970
[21] Appl. No.: 102,476

[52] U.S. Cl. ..................29/411, 29/417, 29/455, 188/259
[51] Int. Cl. ...........................................B23p 17/00
[58] Field of Search ..................29/445, 411, 416, 417; 188/250 H, 259 X

[56] References Cited

UNITED STATES PATENTS

| | | |
|---|---|---|
| 2,175,399 | 10/1939 | Judd ................................188/259 X |
| 2,692,843 | 10/1954 | Winther .............................188/259 X |
| 2,768,714 | 10/1956 | Haldeman et al. ....................188/259 |
| 2,867,898 | 1/1959 | Vosler et al. ..........................29/416 |
| 3,431,627 | 3/1969 | Fields ................................29/445 X |
| 3,455,004 | 7/1969 | Tethal ................................29/417 X |

Primary Examiner—Charlie T. Moon
Attorney—Thomas I. Davenport, Edward M. Farrell, John D. Sowell, Alford L. Trueax, Jr. and William R. Nolte

[57] ABSTRACT

This application discloses a method of making flexible brake bands from a continuous sheet of band material, such as thin stainless steel or high carbon steel and sheet lining by providing band end lugs near the side edges, integrally on the sheet by rolls or dies, or by welding on lug strips, applying lining from a continuous sheet, and cutting bands in unit lengths from the composite sheet.

14 Claims, 8 Drawing Figures

INVENTOR.
CHARLES H. HAAS
BY
Edward M. Farrell

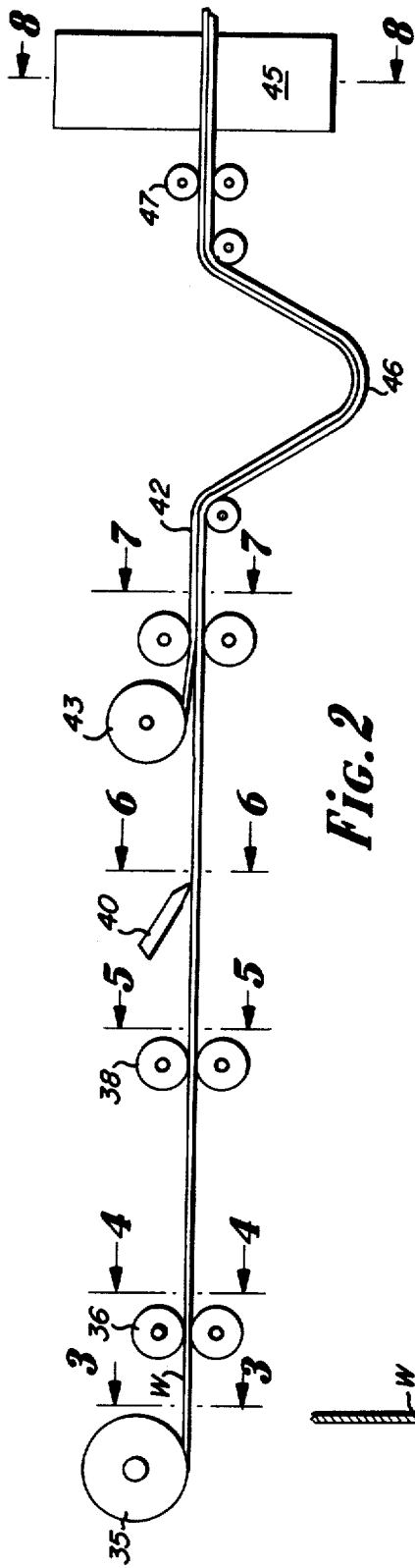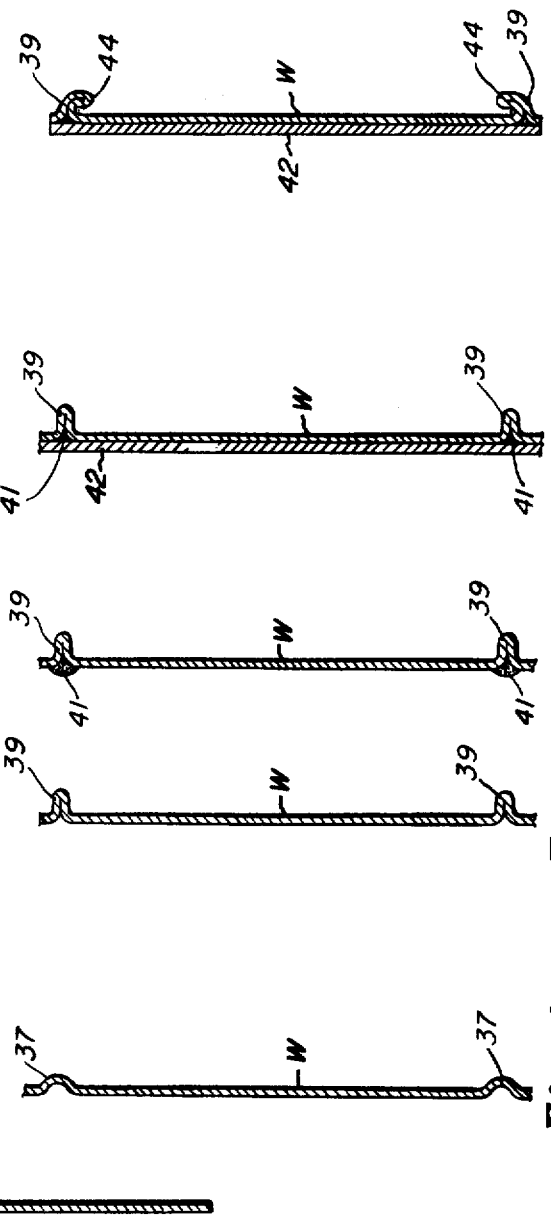

METHOD OF MAKING FLEXIBLE BRAKE BANDS

BACKGROUND OF INVENTION

This invention is concerned with the manufacture of flexible brake bands of the general type shown in U.S. Pat. No. 3,431,627, B.G. Fields, Mar. 11, 1968, in which a split flexible band strap has actuating lugs at or near its ends and is provided with interior lining to operate on the exterior surface of a drum, as of automatic transmissions for automobiles. In the patent referred to the band straps are thin and flexible so as to be capable of being wrapped around the drum from the flat condition without requiring power machine action to effect the change in shape for drum conformation. Such bands have come to be known as the "wrap-around" type; also the actuating lugs in the patent embodiment are formed integrally in the band strap.

It has been customary to form these bands one at a time, which is an expensive procedure and often results in nonuniform units.

SYNOPSIS OF INVENTION

According to the present invention, the brake band straps, lugs, and lining are formed of continuous length stock, at least for a considerable number of units, and band units are cut off from the composite sheet strip.

The band strap stock is fed from a roll of material. Thin flexible resilient sheet stainless steel or high carbon steel is considered as the preferable material and is readily adaptable for having integral lugs formed therein. The lugs may also be formed from shaped long strips of stock which is welded to the strap stock sheet before the continuous lining is applied prior to unit cut-off. The lugs may be given a final operation after the lining has been applied, before or after the band units have been cut off.

DRAWINGS

The objects of the invention, as well as various features of novelty and advantages will be apparent from the following description of an exemplary embodiment, reference being made to the accompanying drawings, wherein:

FIG. 2 is a diagrammatic elevational view of a plant system according to one mode of the invention in which lugs are formed integrally in the brake band strap, as in the FIG. 1 form;

FIG. 3 is a section through the band strap sheet stock as supplied from a roll, as on the line 3—3 of FIG. 2;

FIG. 4 is a section similar to FIG. 3 showing the sheet after the first roll forming action, as on line 4—4 of FIG. 2;

FIG. 5 is a section similar to FIG. 3 showing the sheet after the second roll forming action, as on line 5—5 of FIG. 2;

FIG. 6 is a section similar to FIG. 3 showing the sheet after a line welding operation, as on line 6—6 of FIG. 2;

FIG. 7 is a section similar to FIG. 3 showing the sheet after a brake lining sheet has been bonded to the strap sheet;

FIG. 8 is a section similar to FIG. 3 showing the composite sheet assembly after a final shaping action has been performed on the strap lugs; also showing a unit being cut off from the composite sheet.

SPECIFIC DESCRIPTION

Figure 1:
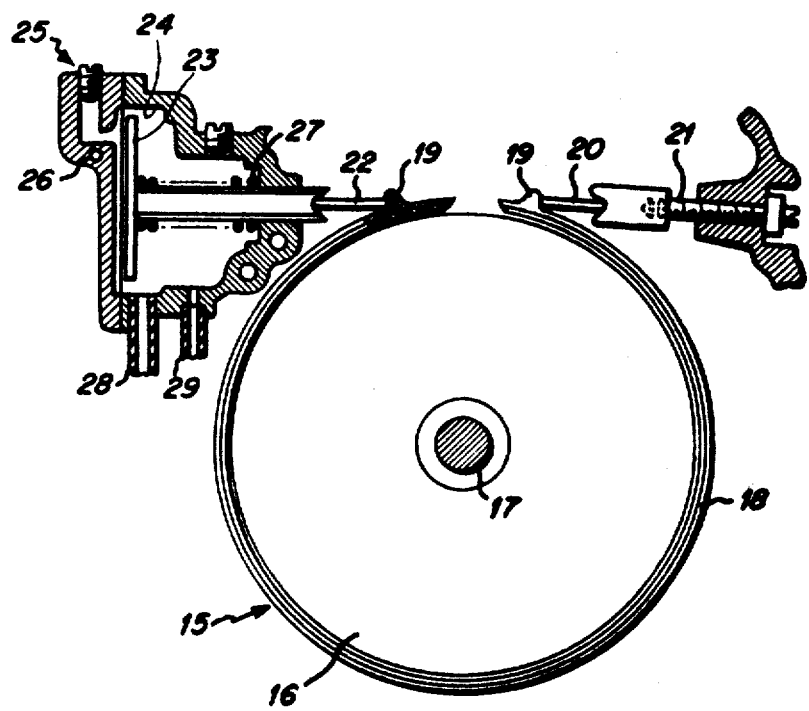
FIG. 1 is a trans-axial elevation, partly in section, showing a completed band in operative position on a brake drum, as of an automobile transmission gear unit.

Referring first to FIGS. 1–8 illustrating one mode of the invention in which actuating lugs are formed integrally in the band strap, FIG. 1 shows a completed band 15 in operative position on a brake drum 16 carried on a shaft 17, as of a transmission gear unit. The band comprises a strap 18, as of flexible resilient metal, such as stainless steel, high carbon steel, other known strong flexible metals, or the like, having integrally struck actuating lugs 19 near the ends at the open side. One of the lugs may be anchored, as against a reaction rod 20 carried by a fixed anchor 21; and the other lug is engaged by an actuating rod 22 of the piston 23 of cylinder 24 of a power device, generally indicated at 25, carried on an anchor pin 26. A spring 27 urges the piston 23 and its rod 22 toward brake-releasing position. Pressure fluid through fluid line 28 empowers the piston in brake-applying direction, fluid line 29 at the other end of the cylinder exhausting fluid for brake application or supplying pressure fluid to aid brake release, as desired.

The strap 18 could be made of relatively thick material and formed to generally circular shape before installation or, as indicated above, it may be relatively thin and flexible and bent around the drum at installation. The thin flexible band is generally referred to as the "wrap-around" type. It is a common practice to soak the lining of wrap-around bands in oil to make them more flexible for installation.

In the embodiment of equipment and forms shown in FIGS. 2–8 a thin sheet W of flexible high-strength metal, such as stainless steel, high carbon steel, or the like, of sufficient width to form brake bands, is fed from a supply source, such as a roll 35. FIG. 3 shows the sheet in section as supplied.

At a first forming station, FIG. 4, rolls 36 impress longitudinal corrugations, bulges or ribs 37 in the sheet near the side edges where lugs are required.

At a second forming station, FIG. 5, rolls 38 squeeze the sides of the corrugations together laterally to form doubled projecting lug ribs 39 from the corrugations 37.

At a third station, FIG. 6, a weld gun 40, such as an arc or gas welder, deposits a line of molten metal 41 to join the sides of the ribs 39 at the root or base but largely or wholly below the smooth side surface of the sheet.

At the next station a sheet of brake lining material 42 is fed from a supply roll 43 and bonded in known manner to the plane side of the strap sheet. It will be understood that this strap sheet surface will be given a preliminary treatment, such as roughening by shot peening, washing, drying, coating, and the like, in the usual manner before the lining sheet is applied.

It is desirable to bend or turn the lug ribs on the ends transversely to their height, as shown at 44 in FIG. 8, to aid in positioning and retaining the brake actuating elements, as the rods 20, 22. These turned end elements also stiffen the ribs. They are more readily formed, if sharply bent over as shown, by die striking tools than by rolls. If merely bent over at an angle from the root, the bending could be performed by a continuously acting roll set, in this case preferably acting on the strap sheet before the sheet lining is applied.

Herein the rib bending is indicated to be performed in intermittent steps by die mechanism 45 located at another station along the line, a loop 45 for storage being provided in the composite sheet to provide slack between the continuously moving portion of the sheet and the intermittently moving portion. Intermittently acting feed rolls 47 move the material from the loop 46 to the die forming mechanism 45. The loop will have wide curvature, large radii, to accommodate the composite sheet with lug ribs and brake lining. If desired, the lining may be soaked in oil at this stage to increase the flexibility of the composite band. The loop is shown as extending downward and hanging freely but if this should require an undesirable floor pit the loop can readily be carried by rolls of yieldable draping or storage means above floor level in known manner.

The intermittently acting die forming mechanism can readily act upon the length of a considerable number of bands, a dozen or more, at each cycle or stroke and the same or related mechanism can trim and cut individual bands off the end of the composite sheet, as indicated in FIG. 8.

In the same die forming operation the lugs could be bent transversely of their length as well as transversely of their height, if desired, to further rigidify them and provide better sockets for the operating rods. In any event, the lug rigidity and strength are increased, first by doubling the corrugations, second by fusion or melt-welding their sides together at the root, third by end-bending, and fourth by transverse bending, if used.

While some of the detail operations commonly performed in manufacturing lined brake-band units have not been mentioned specifically, they can be performed more rapidly and more uniformly by the present continuous sheet line procedure than is possible when making bands one at a time.

While one embodiment of the invention has been described for purposes of illustration, it is to be understood that there may be other embodiments and modifications within the general scope of the invention.

I claim:

1. A method of making flexible lined brake bands, comprising in combination, feeding a strap sheet of about strap band length in width in continuous movement, forming lug strips on the strap sheet in continuous movement, applying lining sheet to the smooth side of the lug-carrying strap sheet in continuous movement, and cutting lined band units with end lugs from the composite lined lug-carrying sheet.

2. The method as set forth in claim 1, in which the lug forming step includes a line fusion welding action along the length of the strap sheet.

3. The method as set forth in claim 1, further characterized by the fact that the lug strips are formed by forming integral longitudinal ribs in the strap sheet.

4. The method as set forth in claim 3, further characterized by the fact that said integral longitudinal ribs are formed first as open corrugations, then formed as ribs by squeezing together the sides of the corrugations.

5. The method as set forth in claim 4, further characterized by the fact that the roots of the sides of the ribs are fuse-welded together in longitudinal lines.

6. The method as set forth in claim 5, further characterized by the fact that the fuse weld lines lie substantially below the plane side surface of the strap sheet opposite the side with the ribs, and that the lining band sheet is secured to the plane side.

7. The method as set forth in claim 3, further characterized by the fact that the ribs are bent transversely to their height in a subsequent operation.

8. The method as set forth in claim 7, further characterized by the fact that said ribs are also bent transversely to their length in a subsequent operation, the subsequent bending of the ribs forming sockets for holding brake actuating rods in position.

9. The method as set forth in claim 7, further characterized by the fact that the ends of the ribs are bent over relative to the lower body portion of the ribs.

10. The method as set forth in claim 7, further characterized by the fact that said subsequent rib-bending operation is performed after the brake lining sheet has been applied.

11. The method as set forth in claim 10, further characterized by the fact that said subsequent rib-bending operation is performed intermittently on the advancing composite sheet.

12. The method as set forth in claim 11, further characterized by the fact that said subsequent rib-forming operation is performed on a length of composite sheet sufficient to provide width for a plurality of brake bands.

13. The method as set forth in claim 1, further characterized by the fact that lugs are formed by forming longitudinal open corrugations in said strap sheet near the edges, squeezing the sides of the corrugations together to form ribs, welding the root ends of the rib sides together, and subsequently bending the lug ribs transversely to their height and length to form positioning sockets for brake operating elements.

14. The method as set forth in claim 13, further characterized by the fact that said subsequent operation is performed after the brake lining sheet has been applied, by an intermittent die action which embraces the length of a plurality of band widths at each operating cycle.

* * * * *